US006551153B1

(12) United States Patent
Hattori

(10) Patent No.: US 6,551,153 B1
(45) Date of Patent: Apr. 22, 2003

(54) THROTTLE CONTROL FOR SMALL WATERCRAFT

(75) Inventor: Toshiyuki Hattori, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/494,392

(22) Filed: Jan. 31, 2000

(30) Foreign Application Priority Data

Jan. 29, 1999 (JP) ........................................ 11-022650

(51) Int. Cl.[7] ............................................ B60K 41/00

(52) U.S. Cl. ......................... 440/87; 114/55.5; 74/489; 74/491

(58) Field of Search ............................ 440/84, 85, 86, 440/87; 114/55.5; 123/349, 352, 360; 180/272; 200/61.85, 61.87; 74/551.8, 551.9, 480 R, 489

(56) References Cited

U.S. PATENT DOCUMENTS 3,645,151 A * 2/1972 Yoshikawa ................... 74/489
3,694,596 A * 9/1972 Carlson ................... 200/61.87
3,845,847 A * 11/1974 Camp ........................... 74/489
4,138,601 A 2/1979 Nakamura et al. ........ 200/61.85
4,155,418 A * 5/1979 Tremblay et al. ...... 180/103 BF
4,186,291 A * 1/1980 Swanson ..................... 74/489
4,191,065 A * 3/1980 Golobay et al. .............. 74/489
4,212,459 A * 7/1980 Wolf .......................... 273/1 E
4,213,513 A * 7/1980 Beck ........................... 180/272
4,286,700 A * 9/1981 Morris et al. ................. 74/488
4,364,283 A * 12/1982 Ricardo ........................ 74/489
4,435,961 A * 3/1984 Stewart ...................... 74/502.2
4,701,740 A * 10/1987 Reuss et al. ................ 338/164
4,838,113 A * 6/1989 Matsushima et al. ...... 74/551.8
4,847,454 A * 7/1989 Hiruma ................... 200/61.85
4,870,933 A * 10/1989 Mizuno ....................... 123/325
4,899,610 A * 2/1990 Bourret ........................ 74/489
5,171,171 A * 12/1992 Tani .......................... 114/55.5
5,231,965 A 8/1993 Muzzy ........................ 123/325
5,399,111 A * 3/1995 Kobayashi et al. ........ 114/55.5
5,429,533 A 7/1995 Kobayashi et al. ........... 440/42
5,524,589 A 6/1996 Kikkaqwa et al. .......... 123/396
5,575,255 A * 11/1996 Abe et al. .................... 123/336
5,582,125 A * 12/1996 Matsumoto ................ 114/55.5
5,593,330 A * 1/1997 Kobayashi ................... 440/84
5,685,271 A * 11/1997 Taomo et al. .............. 74/500.5
5,775,167 A * 7/1998 Maietta ..................... 74/480 R
5,789,884 A * 8/1998 Hancock ..................... 318/280
5,829,312 A * 11/1998 Berg et al. ..................... 47/489
5,862,713 A * 1/1999 Tsunoda et al. .............. 74/526
5,913,373 A * 6/1999 Forrest ........................ 180/6.2
5,941,188 A * 8/1999 Takashima ................. 114/55.5
6,089,932 A * 7/2000 Nanami et al. ............... 440/88
6,159,059 A 12/2000 Bernier et al. ................ 440/40
6,231,410 B1 5/2001 Berniet et al. ................ 440/40
6,273,771 B1 * 8/2001 Buckley et al. ............... 440/84

* cited by examiner

*Primary Examiner*—Stephen Avila
*Assistant Examiner*—Lars A. Olson
(74) *Attorney, Agent, or Firm*—Knobbe, Martens, Olson & Bear, LLP.

(57) ABSTRACT

A throttle control system eases operation of the throttle lever on a small watercraft to improve rider comfort. The small watercraft includes an internal combustion engine and a steering mechanism for steering the watercraft. The steering mechanism includes a handlebar assembly. The engine includes an air induction system that supplies air to the engine and includes a throttle device configured for controlling the amount of air supplied to the engine. The control system includes a throttle operator, an operator position sensor, a controller and an actuator. The throttle operator is located on the handlebar assembly. The operator position sensor is configured to detect the position of the throttle operator and to communicate with the controller. The actuator is configured to adjust the throttle device in response to the controller.

35 Claims, 5 Drawing Sheets

THROTTLE CONTROL FOR SMALL WATERCRAFT

PRIORITY INFORMATION

This application is based on and claims priority to Japanese Patent Application No. 11-022,650, filed Jan. 29, 1999, the entire contents of which is hereby expressly incorporated by reference.

BACKGROUND OF THE INVENTION

1. Field of the Invention

The present invention generally relates to an improved mechanism for controlling the speed of a personal watercraft. More particularly, the present invention relates to an improved throttle control system for a personal watercraft.

2. Description of Related Art

Personal watercraft are a relatively small sporty-type of watercraft wherein the rider sits or stands more on top of the watercraft than in other types of watercraft. Typically, a personal watercraft is designed to be operated by a single rider or operator, although accommodations are frequently made for one or more passengers.

Personal watercrafts are typically powered by an internal combustion engine. Fuel is supplied to the engine by charge formers, which can be carburetors or fuel injectors depending upon the application. Air is supplied to the engine by an air induction system. Located within the air induction system is one or more throttle valves that regulate the amount of air delivered to the engine. Because fuel flow is typically metered in proportion to the air flow, the throttle valves, in essence, control the power output of the engine and thus the speed of the watercraft as is well known in the art.

Personal watercraft typically include a handlebar that is mounted to an upper deck of the watercraft. The operator uses the handlebar to steer the watercraft. On the handlebars, near a grip, is a throttle lever. The throttle lever is typically directly coupled to the throttle valves by one or more cables. Accordingly, the operator controls the position of the throttle valves and thereby the speed the watercraft by moving the throttle lever.

The throttle valves are normally biased to an idling position by one or more return springs. Another spring biases the throttle lever back to an unactuated position that corresponds to the idle position of the throttle valves. In order to further open the throttle valves and increase the speed of the watercraft, the operator typically grasps the throttle lever with one or more of her fingers and moves the lever towards the handlebar grip. When the operator releases the throttle lever, the return springs force the throttle valves and the throttle lever back to the idling position. Therefore, in order to maintain the speed of the watercraft, the operator must hold the throttle lever at a specific position against the return force of the return springs. Furthermore, if the operator's fingers slip, the throttle lever will return quickly to the idling position causing the watercraft to decelerate suddenly.

SUMMARY OF THE INVENTION

The prior art system for controlling the position of the throttle valves in a personal watercraft has several disadvantages. For example, to maintain the speed of the watercraft, the operator must hold the throttle lever against the force of the return springs. Accordingly, the operator's fingers may become tired after holding the throttle lever only for awhile. Another problem with the prior art system is that if the operator suddenly lets go of the throttle lever the throttle valves quickly return to their idling position causing the watercraft to decelerate quickly. This sudden deceleration can cause the watercraft to suddenly slip from a planing state to a non-planing state.

Accordingly, one aspect of the present invention involves a personal watercraft comprising a hull and an internal combustion engine disposed within the hull. The engine includes an air induction system that supplies air to the engine and has a throttle device to regulate the amount of air supplied to the engine. A steering.mechanism steers the watercraft and includes a handlebar assembly coupled to the hull for this purpose. A throttle device control system includes a throttle operator that is located on the handlebar assembly and is arranged to be controlled by a rider of the watercraft. An operator position sensor is configured to detect the position of the throttle operator and to output a data signal that is indicative of the detected position of the throttle operator. A controller communicates with the operator position sensor to receive the data signal and is configured to output a control signal in response to the data signal. An actuator communicates with the controller. The actuator also is coupled to the throttle device and is adapted to adjust the throttle device in response to the control signal from the controller.

Another aspect of the present invention involves a personal watercraft comprising a hull and an internal combustion engine disposed within the hull. The engine includes an air induction system that supplies air to the engine and has a throttle device to regulate the amount of air supplied to the engine. A steering mechanism controls the steering movement of the watercraft and includes a handlebar assembly coupled to the hull. A throttle device control system includes a throttle operator that is located on the handlebar assembly and is arranged to be controlled by a rider of the watercraft. Means are provided for detecting a position of the throttle operator, and for moving said throttle device in response to the detected position of the throttle operator.

Further aspects, features, and advantages of the present invention will become apparent from the detailed description of the preferred embodiment which follows.

BRIEF DESCRIPTION OF THE DRAWINGS

These and other features, aspects and advantages of the present invention now will be described with reference to the drawings of preferred embodiments of the invention, which are intended to illustrate and not to limit the present invention, and in which drawings.

DETAILED DESCRIPTION OF THE PREFERRED EMBODIMENTS OF THE INVENTION

The present invention generally relates to an improved throttle valve control system for a personal watercraft. The throttle valve control system is described in conjunction a personal watercraft because this is an application for which the system has particular utility. Those of ordinary skill in the relevant arts will readily appreciate that the arrangements described herein also may have utility in a wide variety of other settings, including other types of watercraft and land vehicles.

Figure 1:
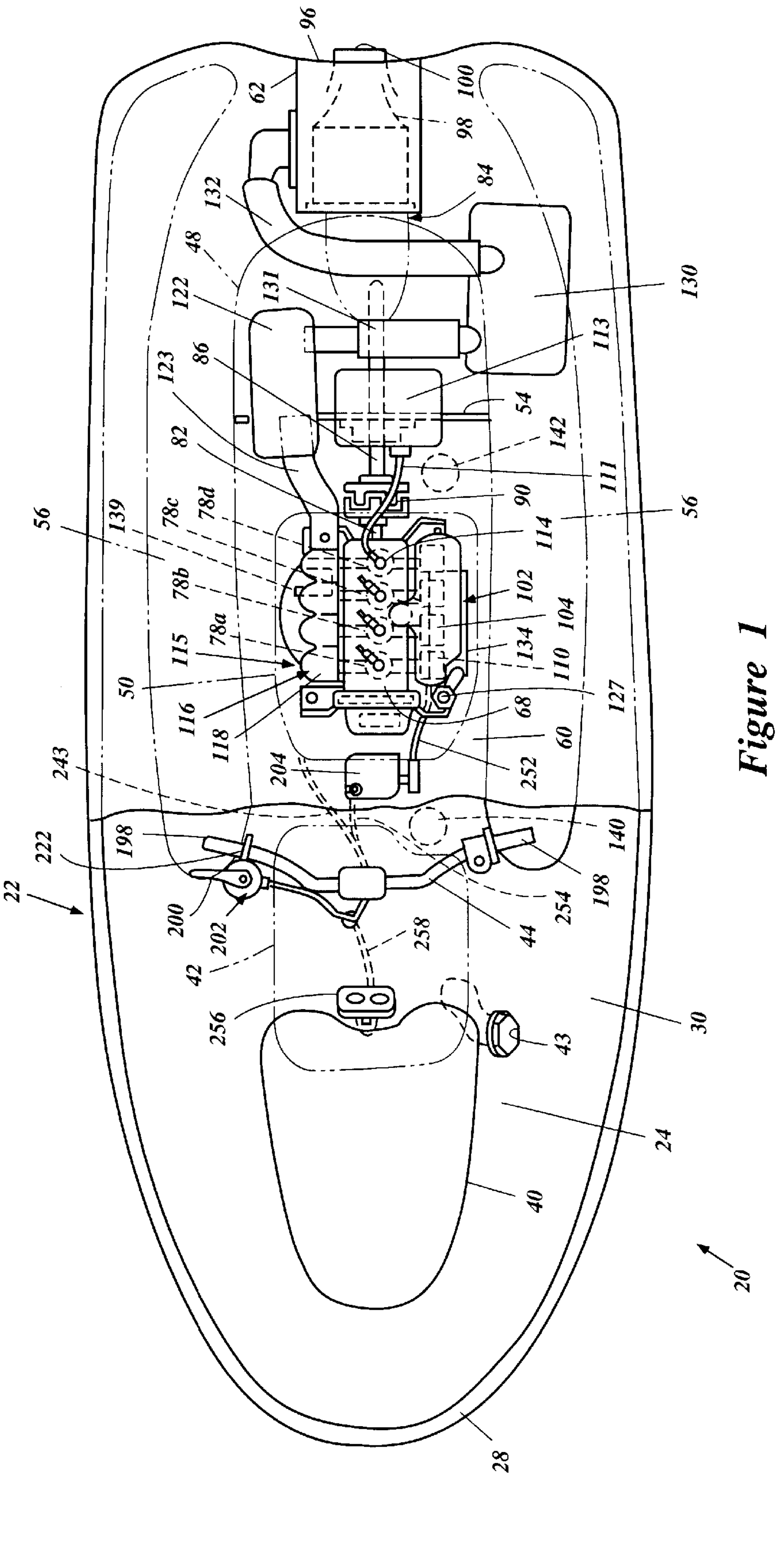
FIG. 1 is a partially sectioned top view of a personal watercraft, which has a throttle valve control system configured in accordance with the present invention, with some of the watercraft components and features illustrated in phantom.
Figure 2:
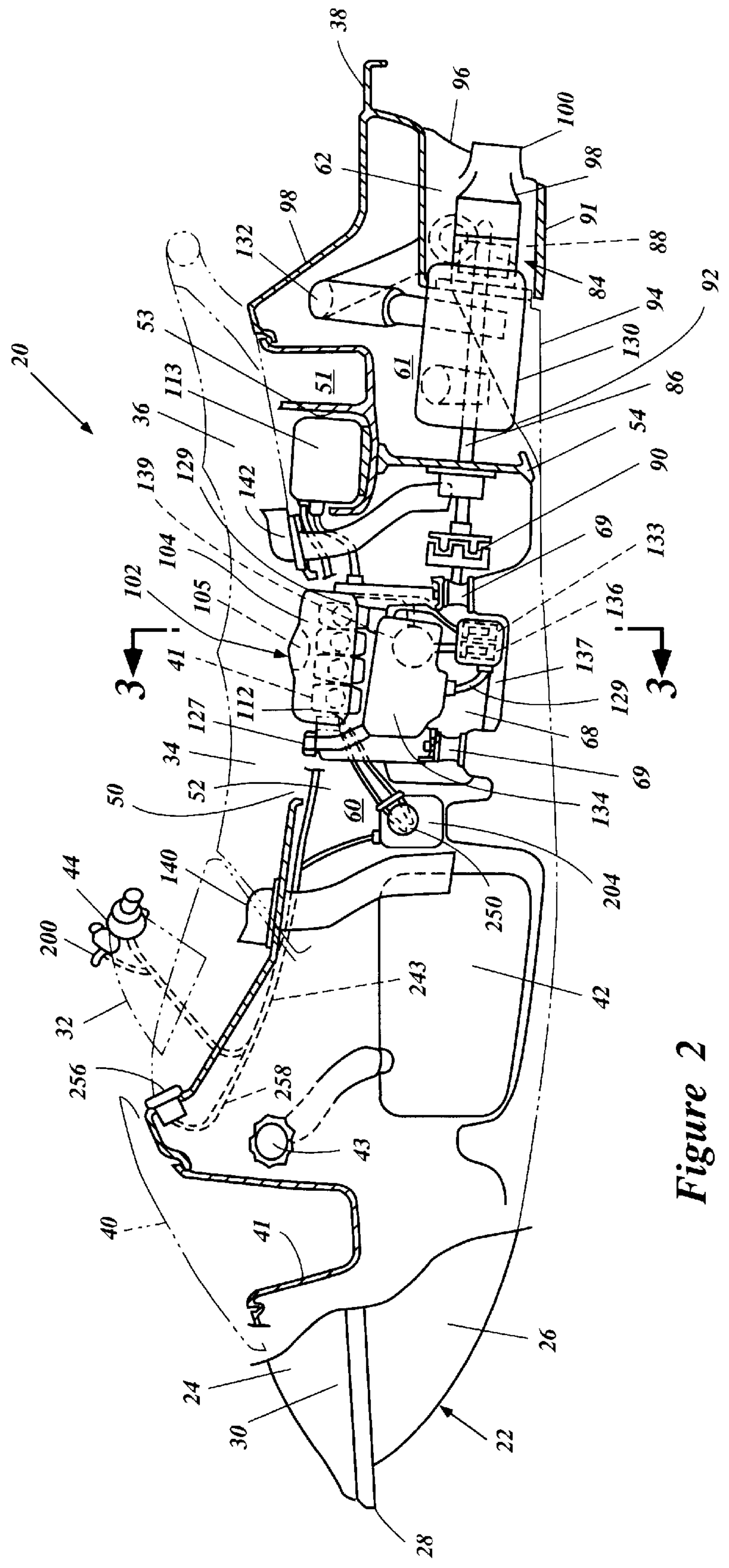
FIG. 2 is a partially sectioned side view of the watercraft illustrated in FIG. 1, with some internal components of an engine and jet pump illustrated in phantom.

With reference now to FIGS. 1 and 2, a personal watercraft, which is indicated generally by the reference numeral 20, is illustrated therein. The watercraft 20 includes a hull 22 that is defined by a top portion or deck 24 and a lower portion 26. These portions of the hull 22 are preferably formed from a suitable material such as, for example, a molded fiberglass reinforced resin. For instance, the hull lower portion 26 can be formed using a sheet molding compound (SMC), i.e., a mixed mass of reinforced fiber and thermal setting resin, that is processed in a pressurized, closed mold. The molding process desirably is temperature controlled such that the mold is heated and cooled during the molding process. For this purpose, male and female portions of the mold can include fluid jackets through which steam and cooling water can be run to heat and cool the mold during the manufacturing process.

The lower hull portion 26 and the upper deck 24 are joined around the peripheral edge at a bond flange 28. Thus, the bond flange 28 generally defines the intersection of the lower portion 26 of the hull 22 and the deck 24.

As viewed in a direction from the bow to the stern of the watercraft 20, the upper deck portion 24 includes a bow portion 30, a control mast 32, a front seat 34, a rear seat 36 and a boarding platform 38. The bow portion 30 preferably slopes upwardly toward the control mast 32. A hatch cover 40 can be provided within the bow portion 30. The hatch cover 40 preferably is pivotally attached to the upper deck 24 and is capable of being selectively locked in a closed and substantially watertight position. The hatch cover 40 covers a storage compartment 41.

The control mast 32 extends upward from the bow portion 30 and supports a handlebar assembly 44, which includes a handlebar and a pair of handlebar grips 198 that are mounted on the ends of the handlebar. The handlebar assembly 44 controls the steering of the watercraft 20 in a conventional manner. The handle bar assembly 44 also carries a variety of the controls of the watercraft, such as, for example, a start switch and a lanyard switch. A throttle lever 200, that will be described in detail below, is positioned on the handlebar next to one of the grips 198.

With continued reference to FIGS. 1 and 2, the upper deck 24 further comprises a longitudinally extending seat pedestal 48. In the illustrated arrangement, the pedestal 48 supports the front seat 34 and the rear seat 36. The front 34 and rear seats 36 are desirably of the straddle-type. A straddle-type seat is well known as a longitudinally extending seat configured such that operators and passengers sit on the seat with a leg positioned to either side of the seat. Thus, an operator and at least one passenger can sit in tandem on the seats 34, 36. Of course, the two seats 34, 36 can be combined in some arrangements into a single seat mounted to the raised pedestal 48. Moreover, these seats 34, 36 are preferably centrally located between the sides of the hull 22.

Figure 3:
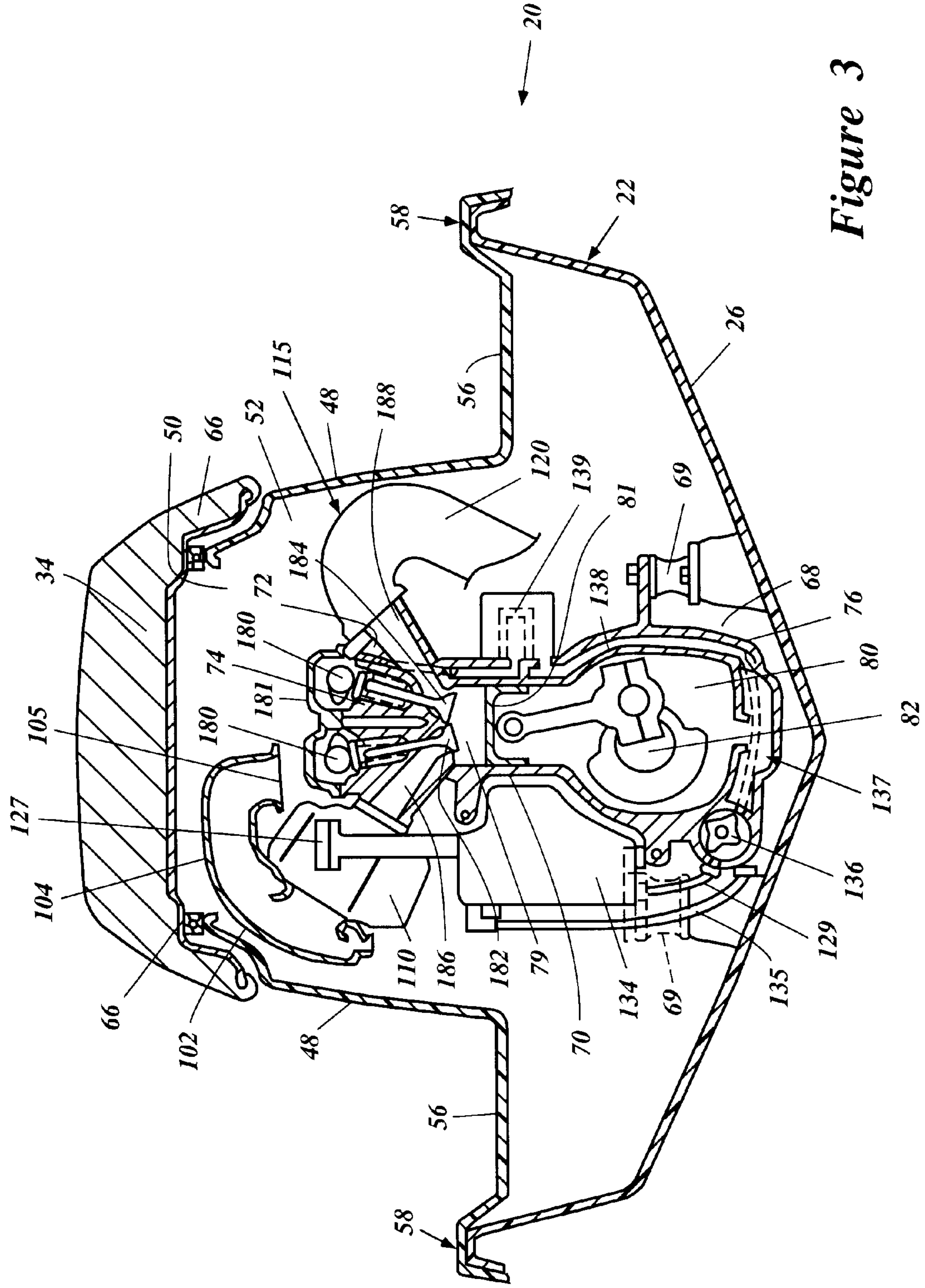
FIG. 3 is a cross-sectional view of the watercraft illustrated in FIG. 1, taken along the line 3—3 in FIG. 2.

As best illustrated in FIGS. 1 and 3, foot areas 56 are formed alongside the pedestal 48 and are generally defined as the lower area located between the pedestal 48 and a pair of raised side gunwales or bulwarks 58 that extend along the outer sides of the watercraft 20. The foot areas 56 preferably are sized and configured to accommodate the lower legs and feet of the riders who straddle the seats 34, 36. As described above, the illustrated watercraft 20 also includes the boarding platform 38 that is connected to the illustrated foot areas 56 and that is formed at the rear of the watercraft 20 behind the pedestal 48. The boarding platform 38 allows ease of entry onto the watercraft 20.

With reference back to FIGS. 1 and 2, the front seat 34 covers an access opening 50 that allows access into a cavity 52 defined by the hull 22. The cavity 52 formed between the two hull sections 24, 26 is divided by one or more bulkheads. In the illustrated watercraft 20, a bulkhead 54 preferably is disposed within the hull cavity 52 to divide the cavity 52 into an engine compartment 60 and a pump compartment 61. As will be described, air ducts extend into the cavity to ventilate the cavity and to cool various components of the watercraft.

As described above, the access opening 50 is formed on a top surface of the pedestal 48 and is desirably positioned beneath at least one of the seats 34, 36. Thus, the access opening 50, or maintenance opening, is covered by the seat 34 in a water-sealing manner. For this purpose, one or more seals 66, or gaskets, can circumscribe the opening 50.

The rear seat 36 in the illustrated embodiment covers the an electronic control unit (ECU) 113. The ECU is supported and protected by a platform 53, which is supported within the hull 22 by the bulkhead 54. The platform 53 also forms a storage compartment 51 that is also covered by the rear seat 36.

An engine 68 is mounted within the cavity 52 of the illustrated watercraft 20 using resilient mounts 69 as is well known to those of ordinary skill in the art. Although the engine 68 may be of any known type, in the illustrated embodiment and in the preferred form, the engine 68 is of the four-cycle, overhead valve type. It should be appreciated that while the illustrated engine 68 is of the four-cycle variety, the engine 68 can also be of the two-cycle or rotary variety as well.

The general construction of a four-cycle, overhead valve type engine is well known to those of ordinary skill in the art. As illustrated in FIGS. 1 through 3, the engine 68 generally comprises a cylinder block 70, a cylinder head 72, a cylinder head cover 74, and a crankcase 76. Four in-line cylinders 78*a–d* are formed within the cylinder block 70. However, the engine 68 can have one, two or more than three cylinders and can be inclined, opposed or formed with two banks of cylinders.

The cylinders 78 are capped by the cylinder head 72 and cylinder head cover 74. A piston 81 is reciprocally mounted within each of the cylinders 78*a–d* and a combustion chamber 79 is defined within the cylinder 78 by the top of the piston 81, the wall of the cylinder and a recess formed within a lower surface of the cylinder head 72.

The cylinder head 72 journals a pair of overhead camshafts 180 that directly actuate the intake and exhaust valves 182, 184 for opening and closing the intake and exhaust passages 186, 188. The camshafts 180 are covered by a cam cover 181. The intake valves 182 permit the flow of an intake charge into the combustion chambers 79 of the engine from an induction system 102 that is disposed at one side of the cylinder head. The induction system. 102 will be described in more detail below. As is well-known in the art, the exhaust valves 184 govern the flow of exhaust from the combustion chamber 79.

The crankcase 76 is attached to the opposite end of the cylinder block 70 from the cylinder head 72. A crankcase chamber 80 generally is defined by the crankcase 76 and the cylinder block 70. A crankshaft 82 is positioned within the crankcase 80 and is connected to the pistons 81 through a set of connecting rods. As the pistons 81 reciprocate within the cylinders 78, the crankshaft 82 is rotated within the crankcase chamber 80.

As shown in FIGS. 1 and 2, the crankshaft 82 preferably is in driving relation with a jet propulsion unit 84 that is provided in the pump chamber 62. The pump chamber 62 is formed in part by the hull 22 and a bottom plate 91 that protects the lower side of the jet propulsion unit 84. The jet propulsion unit 84 preferably includes an impeller shaft 86 to which a propeller or an impeller 88 is attached. The crankshaft 82 and the impeller shaft 86 desirably are connected through a conventional shock-absorbing or resilient coupling 90. The impeller shaft 86 extends in the longitudinal direction through a propulsion duct 92, that can be defined by the lower portion of the hull 26. The propulsion duct 92 has a water inlet 94 positioned on a lower surface of the hull 22. The lower portion 26 of the hull 22 also includes an opening 96 in the stern of the watercraft in which a jet outlet port 98 of the propulsion unit 84 is positioned. The propulsion unit 84 generates the propulsive force by applying pressure to water drawn up from the water inlet port 94 by rotating the impeller shaft 86 and by forcing the pressurized water through the jet outlet port 98 in a manner well known to those of ordinary skill in the art.

A nozzle deflector 100 or steering nozzle is connected to the discharge nozzle 98 of the propulsion unit 84. The nozzle deflector 100 desirably moves in the left/right and vertical directions via a well known gimbal mechanism. The nozzle deflector 100 is connected to the handlebar assembly 44 through a steering mechanism and a trim mechanism (not shown), whereby the steering and trim angles can be changed by the operation of the handlebar assembly 44 and the associated trim controls.

As best illustrated in FIG. 3, the engine 68 also includes an induction system 102 that provides an air charge to each combustion chamber 80 for combustion. Preferably, the air intake system includes an intake box 104 or silencer into which air from within the engine compartment 60 is drawn through an air induction inlet 105. The air is then delivered to the charge formers 110, which will be described below.

With reference to FIG. 2, fuel is drawn from the fuel tank 42 positioned within the cavity 52 defined by the hull 22. An operator fills the fuel tank 42 through the fuel fill port 43. Conventional means, such as straps (not shown) secure the fuel tank 42 in position along the lower hull portion 26. The fuel is supplied from the fuel tank 42 to the charge former 110 through any suitable fuel pumping arrangement. The charge formers 110 can be carburetors or fuel injectors depending upon the application. The arrangement illustrated in FIG. 2, however, is carbureted.

The carburetors 110 vaporize and mix fuel with the intake air to form an intake charge. A throttle device 112 regulates the air flow through the induction system. In the illustrated embodiment the throttle device is a plurality of butterfly valves 112 that are located in the carburetors 110. However, one of ordinary skill in the art will understand that other types of throttle devices 112 may be used. The throttle device 112 is preferably controlled by a throttle control system in a manner that will be described in greater detail below. Ultimately, the intake charge is delivered to the combustion chamber 79 through the intake passages 186 that are formed in the cylinder head 72.

A suitable ignition system is provided for igniting the air and fuel mixture in each combustion chamber 79. Preferably, this system comprises a spark plug 114 corresponding to each cylinder 78. The spark plugs 114 are preferably fired by a suitable ignition system that is controlled by the ECU 113 as is well known to those of skill in the art. The ECU 113 is connected to the spark plugs by one or more cables 111.

Exhaust gas generated by the engine 68 is routed from the engine 68 to a point external to the watercraft 20 by an exhaust system 115 which includes the exhaust passages 188 leading from each combustion chamber 79 through the cylinder head 72. An exhaust manifold 116 or pipe is connected to a side of the engine 68. As best illustrated in FIG. 3, the exhaust manifold 116 is connected to one side of the engine 68 while the intake system of the engine 68 is connected to the opposite side of the engine 68.

The manifold 116 has a set of branches 118 each having a passage that corresponds to one of the exhaust passages 188 leading from the combustion chambers 79. The branches 118 of the manifold 116 merge at a merge pipe portion 120 of the manifold 116, which extends in a generally forward direction. The merge pipe portion 120 has a further passage through which the exhaust is routed.

An expansion chamber 122, which lies behind the engine 68 on the same side as the exhaust manifold 116, is connected to the exhaust manifold 116, preferably via a flexible member 123 such as a rubber hose. The expansion chamber 122 has an enlarged passage or chamber through which exhaust flows from the passage in the exhaust manifold 116. A catalyst (not shown) may be positioned within the expansion chamber 122.

After flowing through the expansion chamber 122, the exhaust gases flows to a water lock 130, which is located on the opposite side of the watercraft 20. The expansion chamber 122 is preferably connected to the water lock 130 via a flexible hose 131. The exhaust gases flows through the water lock 130, which is preferably arranged in a manner well known to those of ordinary skill in the art, to prevent the backflow of water through the exhaust system to the engine 68. The exhaust gases then pass through a water trap 132, which extends over the pump chamber 62 to the other side of the watercraft 20. The water trap 132 has its terminus on a side of the pump chamber 62.

As shown in FIGS. 1 and 2, most of the expansion chamber 122 and the entire water lock 13 are located in the pump compartment 61, which is formed in part by the bulkhead 54 and lies behind the engine compartment 60. Because of the exhaust gases, the expansion chamber 122 and the water lock 120 are relatively hot. An advantage of the illustrated watercraft 20 is that these hot components are separated from the engine by the bulkhead 54. The platform 53, which is located above the pump compartment 61 also isolates the ECU from these hot components. Another advantage of the illustrated watercraft 20 is that the both the flexible hose 130 and the water trap 132 extend up and across the watercraft 20 and over (i.e., at a vertical position higher than) the pump chamber 62. This configuration prevents water that has entered the exhaust system from reaching the engine 68, especially when the watercraft 20 is capsized.

The engine 68 includes a suitable lubricating system for providing lubricant to the various moving parts of the engine Specifically, an lubrication supply tank 134 is provided on a side of the engine 68 opposite the exhaust system 115 and below the induction system 102. The lubricant tank 134 is filled through the lubricant filler port 127 that extends from the top of the tank 134. A supply hose 135 connects the supply tank 124 to a supply pump 136. The supply pump 136 delivers lubricant to circulating passages 138 within the engine 68. An lubrication filter 139 is preferably inserted into the lubrication path to clean the lubricant as is well known in the art. An lubrication pan 137 that is located at the bottom of the crankcase 76 collects the used lubricant. A scavenge pump 133 returns lubricant in the lubrication pan 137 to the supply tank 134. The scavenge pump 133 is connected to the lubrication tank by a return hose 129.

The engine 68 can also include a suitable liquid and/or air cooling system. Moreover, the watercraft 20 can include a bilge system for drawing water from within the hull cavity 52 and discharging it into the body of water. These systems are well known in the art and their description is not necessary for an understanding of the present throttle control system.

Preferably, air is drawn into the engine compartment 60 through several air ducts. As illustrated, a forward air duct 140 is positioned in front of the engine 68 near the front end of the watercraft 20, and an aft air duct 142 is positioned behind the engine 68 towards the stern of the watercraft 20. As will be recognized, the number of ducts 140, 142 is not critical and can be varied as desired depending upon the application. Due to the strategic locations of the forward duct 140 and the aft duct 142 in general, an air current can be set up within the engine compartment 60 to induce a flow of air across at least a portion of the engine 68; however, such a cross-current need not be used to cool the engine.

The personal watercraft so far described is conventional and represents only an exemplary personal watercraft on which the present throttle control system can be employed. Therefore, a further description of the personal watercraft is not believed necessary for an understanding and appreciation of the present invention.

The throttle control system will now be described with reference to FIGS. 1, 2, 3, 4, and 5. The throttle control system comprises the throttle operator 200, a throttle position sensor 202, and a throttle valve actuator 204. In the illustrated embodiment, as best seen in FIG. 1, the throttle operator 200 comprises a throttle lever 200 that is positioned on the handlebar assembly 44 near the right grip 198. The throttle operator 200 can, however comprise other types of operators, such as, for example, but without limitation, a thumb trigger, a push button, a twist grip, a pedal or the like. The throttle operator also can be located else where on the watercraft 20 and/or assume a variety of orientations on the watercraft in order to ease operations. For instance, in the illustrated embodiment, in the illustrated embodiment, the throttle lever 200 is arranged to rotate about an axis that lies generally normal to an axis of the portion of the handlebar assembly 44 to which it is attached and/or to an axis of the hand grip 198. The throttle operator in some forms can be arranged to move parallel relative to or obliquely with respect to, or about the axis of the portion of the handlebar assembly 44 to which it is attached and/or to an axis of the hand grip 198, e.g., rotation about an axis that coincides with the axis of the hand grip 198, as in the case of a twist grip.

The throttle position sensor 202 is also located on the handlebar assembly 44 near the right grip 198; however, it could also be located elsewhere on the watercraft. In one variation, for instance, the throttle position sensor 202 could be located within the hull and be coupled to the throttle operator by an interposed mechanism.

The throttle valve actuator 204 preferably is located within the cavity 52 of the hull 22. As will be described in detail below, the throttle position sensor 202 indicates the position of the throttle lever 200 to the throttle valve actuator 204. The throttle valve actuator 204 opens and closes the throttle valves 112 in response. Accordingly, the throttle lever 200 indirectly controls the position of the throttle valves 112.

Figure 4:
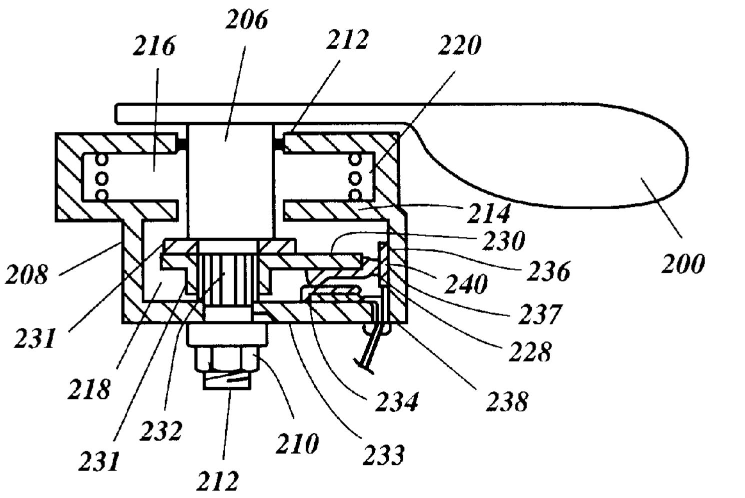
FIG. 4 is a cross-sectional view of a throttle lever and throttle lever position sensor that is configured in accordance with the present invention.
Figure 5:
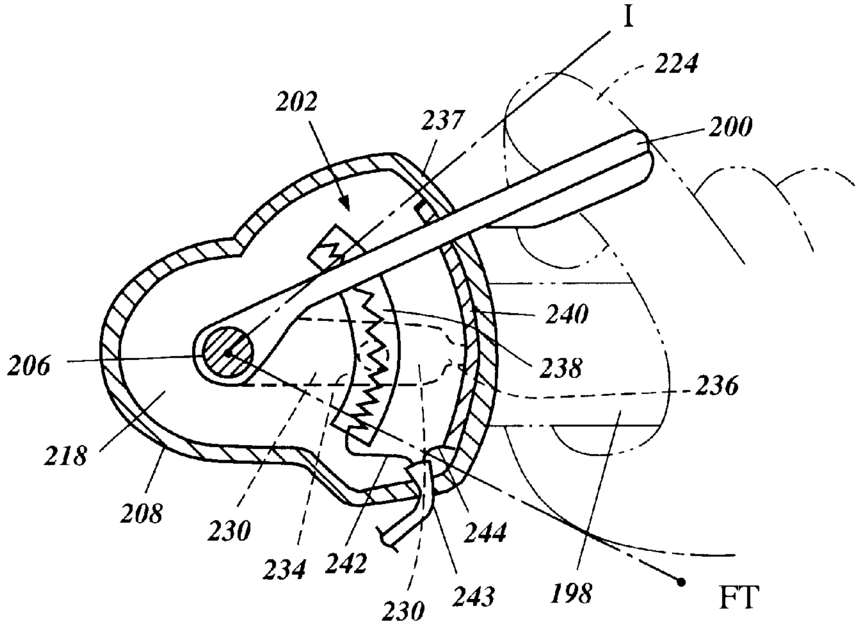
FIG. 5 is partially sectioned top view of the throttle lever and throttle lever position sensor illustrated in FIG. 4.

With reference to FIGS. 4 and 5, the throttle lever 200 includes an elongated shaft 206 that is suitably journaled for rotation within a case 208. The case 208 preferably is substantially waterproof and preferably made of a resin based material. A nut 210 is attached to a threaded portion 212 of the shaft 206 and prevents the throttle lever 200 from being lifted out of the case 208. One or more seals 212 surround the shaft 206 and prevent water from entering the case 208.

An internal wall 214 divides the case 208 into an upper chamber 216 and a lower chamber 218. The upper chamber houses a torsional spring 220 that is attached to the elongated shaft 206. The spring 220 biases the throttle lever 200 to the traditional idling position, which is indicated by line I of FIG. 5. The lower chamber 218 houses the throttle position sensor 202, which will be described in detail below.

As shown in FIG. 1, the case 208 is mounted to a fixture 222 that is attached to the handlebar assembly 44 next to the right hand grip 198. As best seen in FIG. 5, the fixture 222, the case 208, and the throttle lever 200 are arranged such that the operator can grasp the handlebar grip 198 and actuate the throttle lever 200 with her index finger 224. By squeezing her index finger 224, the operator can rotate the throttle lever 200 from the idling position to the full throttle position (indicated by line FT of FIG. 5). When the operator releases the throttle lever 200, the spring 220 returns the throttle lever 200 to the idling position.

With reference back to FIGS. 4 and 5, the throttle position sensor 202 is formed within the lower chamber 218. In the illustrated arrangement, the components of the throttle position sensor 202 form a rheostat. A rheostat is a current-setting device in which one terminal is connected to a resistive element and the second terminal is connected to a movable contact to place a selective section of the restive element into the circuit. The current set by the rheostat comprises the signal indicating the position of the throttle lever 200. It should be appreciated that other circuits could be used in the throttle position sensor 202, such as, for example, a potentiometer. In such a system, the voltage set by the potentiometer would indicate the position of the throttle lever 200. However, the illustrated throttle position sensor 202 is preferred because it uses a small number of parts and is particularly suited for rugged use.

The components of the illustrated arrangement of the throttle position sensor 202 will now be described. In the lower chamber 218, a movable contact 228 is attached to an arm 230. The arm 230 includes annular sleeve 231 that includes slots (not shown). The sleeve 231 fits over splines 232 formed on the lower end of the elongated shaft 206. A C-ring 231 secures the sleeve 231 at an axial position along the elongated shaft 206. Because the arm 230 and the elongated shaft 206 are coupled together, the movable contact 228 rotates with the throttle lever 200.

The moveable contact 228 is made of conductive material, such as, for example, copper. The moveable contact 228 includes a first contact point 234 and a second contact point 236. The first contact point 234 contacts a resistive element 238, which is attached to a lower surface 233 of the lower chamber 218. The resistive element 238 can be manufacture as, for example, a carbon composition film, a metallic film, or a wire-wound resistor. As shown in FIG. 5, the resistive element 238 is arc-shaped. Accordingly, as the throttle lever 200 is rotated, the first contact point 234 remains in contact with the resistive element 238.

The second contact point 236 of the moveable contact 228 contacts a stationary contact 240 that is mounted to a side wall 237 of the case 208. The side wall 237 and the stationary contact 240 are also arc-shaped such that as the throttle lever 200 rotates the second contact 236 stays in contact with the stationary contact 240. The stationary contact 240 is also made of a conductive material such, for example, copper.

A first electric wire 242 is connected the resistive element 238. Similarly, a second electric wire 244 is connected the stationary contact 240. Both wires 242, 244 are protected by a casing 243. The wires 242, 244 are routed through the watercraft 20 and are connected to the ECU 113. A closed circuit consisting of the ECU 113, the first wire 242, the resistive element 238, the moveable contact 228, the stationary contact 240, and the second wire 244 is formed. The ECU 113 supplies a voltage to the circuit.

The current i in the circuit indicates the position of the throttle lever 200 as will be explained below. When the throttle lever 200 is in the idling position, a large portion of the resistive element 238 is placed into the circuit. Accordingly, the circuit has relatively large total resistance $R_1$. Consequently, for a given voltage, the current $i_1$ flowing through the circuit will be relatively small according to the equation V=iR.

In comparison, when the throttle lever 200 is in the full-throttle position, a smaller portion of the resistive element 238 is placed into the circuit. Accordingly, the total resistance $R_{FT}$ of the circuit is less than the total resistance $R_1$ of the circuit in the idling position. Consequently, the current $i_{FT}$ flowing through the circuit is larger than the current $i_1$ flowing through the circuit in the idling position. Thus, for a given voltage the current i indicates the position of the throttle lever 200 in accordance with the linear relationship between i and R. The ECU 113 senses the current and determines the position of the throttle lever.

A wire 254 connects the ECU 113 to the valve actuator 204, which is located in the engine cavity 60 in front of the engine 68 (FIG. 1). The valve actuator 204 comprises a prime mover (not shown), such as, for example, a stepper motor or a servo motor. The actuator also includes a pulley 250. Bowden-wire cables 252 are coupled to the pulley 250 and the throttle valves 112 such that rotation of the pulley 250 causes the throttle valves 112 to open and close. Throttle valve actuator 204 opens and closes the throttle valves 112 in response to a signal generated by the ECU 113.

When the throttle lever 200 is in the idling position, the current i in the circuit is relatively small as explained above. The ECU 113 senses the small current and sends a signal to the actuator 204 to adjust the throttle valves 112 to the idling position. As the throttle lever 200 is moved towards the full throttle position, the current i in the circuit increases. In response, the ECU 113 sends a signal to the actuator 204 to open the throttle valves 112. In this manner, the throttle lever 200 indirectly controls the position of the throttle valves 112.

As seen in FIG. 1, a meter 256 is connected to the circuit by a wire 258; alternatively, the meter 256 is connected to the ECU 113. The meter is mounted onto the control mast 46 and indicates the position of the throttle lever 200 according either the current in the circuit or a signal generated by the ECU 113 in response to the current in the circuit.

From the above description, it is readily apparent that the illustrated throttle control system has several advantages as compared to prior art control systems. For example, prior art throttle valves are normally biased to an idling position by return springs. These return springs generally are relatively stiff in order to overcome the force of air flow across the throttle valve. The prior art throttle levers are typically directly coupled to the throttle valve. Accordingly, the operator must hold the throttle lever against the force of the return springs in order to maintain a specific speed. In comparison, the throttle lever 200 in the illustrated throttle control system indirectly controls the throttle valves 112. That is, the actuator 204 opens and closes the throttle valves in response to the detected position of the throttle lever 200. The return spring 220 returns the throttle lever 200 to the idling position. Accordingly, the return spring 220 can be designed to be significantly weaker than the throttle valve return springs of the prior art. Accordingly, the throttle lever 200 has a "light touch" and the operator's fingers becomes less tired after holding the throttle lever 200 for a long period of time.

Figure 6:
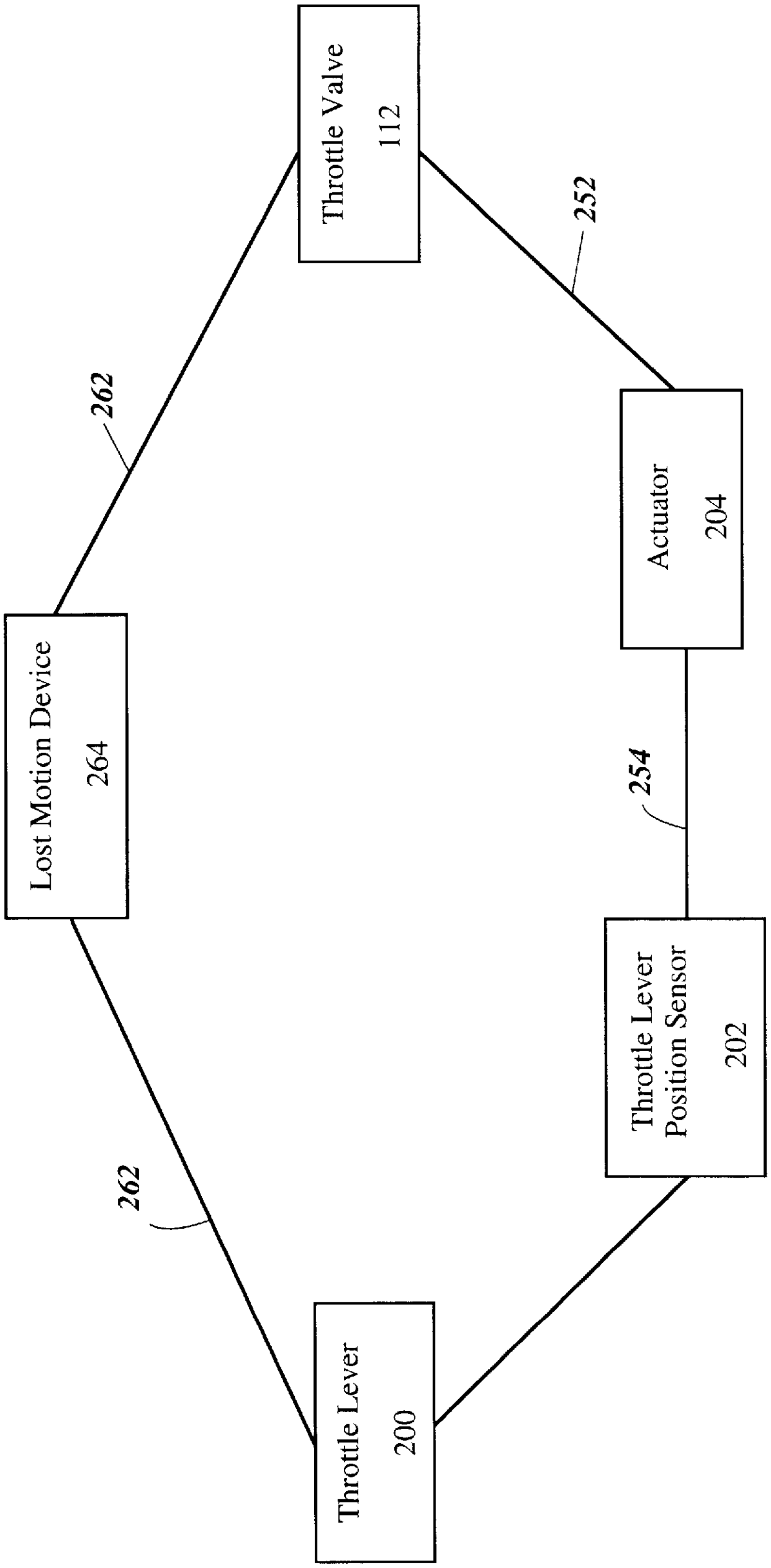
FIG. 6 is a schematic diagram illustrating another embodiment of a throttle valve control system configured in accordance with the present invention.

FIG. 6 is a schematic illustration of another arrangement of a throttle valve control system according to the present invention. The control system includes a throttle lever 200, a throttle lever position sensor 202, and an actuator 204. These components are arranged essentially as described above. The throttle position sensor 202 determines the position of the throttle lever 200. The throttle valve actuator 204 opens and closes the throttle valves 112 in response to the detected position of the throttle lever 200. Accordingly, the throttle lever 200 indirectly controls the position of the throttle valves 112.

The throttle lever 200 is also configured to directly adjust the throttle valves 112. As shown in FIG. 6, the throttle lever 200 is connected by a means such as a Bowden-wire cable 262 to a lost motion device. 264. A wide variety of lost motions devices, which are well known in the art, can be used in accordance with the present invention. Lost motion devices are typically inserted between two elements whereby the motion of one element is to be partially transferred to the other. The lost motion device absorbs the motion of the first element for a range of motion and transfers motion to the second element for another range of motion. For example, a spring can be inserted between two elements. The spring absorbs motion the motion of the first element until the spring is completely compressed. Once compressed, the motion of the first element is transferred to the second element. As shown in FIG. 6, the illustrated lost motion device 264 is connected to the throttle valves 112 by a means such as a Bowden-wire cable 262.

Desirably, the lost motion device 264 absorbs the motion of the Bowden-wire cable 262 when the throttle lever 200 is moved from the idling position to a planing speed position. Accordingly, the throttle lever 200 does not directly open the throttle valves 112 until the watercraft 20 reaches a planing state. Instead, the throttle position sensor 202 detects the position of the throttle lever 200 and the ECU 113 instructs the actuator 204 to adjust the position of the throttle valves 112.

Once the throttle lever 200 passes the planing speed position, the lost motion device 264 no longer absorbs the motion of the throttle lever 200. The throttle lever 200 now directly adjusts the position of the throttle valves 112. Correspondingly, the ECU 113 instructs the actuator 204 to no longer control the position of the throttle valves 112.

This arrangement has several advantages. For example, the control system can be configured such that to achieve planing speeds, the throttle lever 200 only has to be rotated a small distance. That is, the actuator 200 can be configured to open the throttle valves 112 to a planing speed position in response to a small movement of the throttle lever 200. Because personal watercraft 20 are operated mostly in the planing mode, this arrangement is beneficial because it provides the throttle lever 200 with a larger useful range of motion. Accordingly, it is easier for the operator to keep the watercraft 20 in the planing state.

It should also be appreciated that the arrangement of FIG. 6 can also be reversed. That is, the control system can be configured such that the throttle lever 200 directly adjusts the throttle valves 112 until the watercraft 20 reaches a planing state. After a planing state is reached, the lost motion device 262 absorbs the motion of the throttle lever 200 and the throttle lever 200 no longer directly adjust the throttle valves 200. Accordingly, during planing the throttle valves 112 are controlled by the ECU 113 and adjusted by the actuator 204. This arrangement ensures that the throttle lever has a "light touch" during planing speeds. Accordingly, the operator's fingers do not tire during long trips.

Of course, the foregoing description is that of certain features, aspects and advantages of the present invention to which various changes and modifications may be made without departing from the spirit and scope of the present invention. Moreover, a watercraft need not feature all objects of the present invention to use certain features, aspects and advantages of the present invention. The present invention, therefore, should only be defined by the appended claims.

What is claimed is:

1. A small watercraft comprising a hull, an internal combustion engine disposed within the hull, the engine including an air induction system that supplies air to the engine and includes a throttle device to regulate the amount of air supplied to the engine, a steering mechanism including a handlebar assembly coupled to the hull, and a throttle device control system that includes a throttle operator located on the handlebar assembly and arranged to be controlled by a rider of the watercraft, an operator position sensor that is configured to detect the position of the throttle operator and to output a data signal that is indicative of the detected position of the throttle operator, an electronic controller communicating with the operator position sensor to receive the data signal and being configured to output a control signal in response to the data signal, and an actuator communicating with the controller and being coupled to the throttle device, the actuator being adapted to adjust the throttle device in response to the control signal from the controller.

2. The small watercraft of claim 1, wherein the operator position sensor is located on the handlebar assembly.

3. The small watercraft of claim 1, wherein the operator position sensor is located within a substantially waterproof case that is mounted on an exterior of the watercraft.

4. The small watercraft of claim 3, wherein the case is located near a grip of the handlebar assembly, and the throttle operator is coupled to the case.

5. The small watercraft of claim 1, wherein the throttle operator includes a rotational shaft, and the operator position sensor comprises a plurality of moving contacts, which are connected to the rotational shaft, and a resistor, at least one of the plurality of moving contacts contacting the resistor and being arranged such that its position on the resistor is indicative of the throttle operator position.

6. The small watercraft of claim 5, wherein the throttle operator includes a lever coupled to the rotational shaft.

7. The small watercraft of claim 5, wherein the throttle device control system additionally includes a case with a substantially waterproof chamber that houses the operator position sensor, the case also journals the rotational shaft of the throttle operator.

8. The small watercraft of claim 7, wherein the case includes another chamber in which a biasing member is disposed to bias the throttle operator toward an idling position.

9. The small watercraft of claim 5, wherein the control system additionally includes a case with a substantially waterproof chamber that houses the operator position sensor, the case also journals the rotational shaft of the operator.

10. The small watercraft of claim 9, wherein the case includes another chamber in which a biasing member is disposed to bias the operator toward an idling position.

11. The small watercraft of claim 5, wherein the operator includes a lever coupled to the rotational shaft.

12. The small watercraft of claim 1, wherein the throttle operator is located near a hand grip on the handlebar assembly.

13. The small watercraft of claim 1, wherein the throttle operator includes a throttle lever.

14. The small watercraft of claim 1, wherein the throttle device comprises a plurality of throttle valves.

15. The small watercraft of claim 1, wherein the operator includes a rotational shaft, and the operator position sensor comprises a plurality of moving contacts, which are connected to the rotational shaft, and a resistor, at least one of the plurality of moving contacts contacting the resistor and being arranged such that its position on the resistor is indicative of the operator position.

16. A small watercraft comprising a hull, an internal combustion engine disposed within the hull, the engine including an air induction system that supplies air to the engine and includes a throttle device to regulate the amount of air supplied to the engine, a steering mechanism including a handlebar assembly coupled to the hull, and a throttle device control system that includes a throttle operator located on the handlebar assembly and arranged to be controlled by a rider of the watercraft, an operator position sensor that is configured to detect the position of the throttle operator and to output a data signal that is indicative of the detected position of the throttle operator, a controller communicating with the operator position sensor to receive the data signal and being configured to output a control signal in response to the data signal, and an actuator communicating with the controller and being coupled to the throttle device, the actuator being adapted to adjust the throttle device in response to the control signal from the controller, wherein the throttle device control system is configured such that the actuator only adjusts the position of the throttle device until the watercraft reaches a planing state.

17. A small watercraft comprising a hull, an internal combustion engine disposed within the hull, the engine including an air induction system that supplies air to the engine and includes a throttle device to regulate the amount of air supplied to the engine, a steering mechanism including a handlebar assembly coupled to the hull, and a throttle device control system that includes a throttle operator located on the handlebar assembly and arranged to be controlled by a rider of the watercraft, an operator position sensor that is configured to detect the position of the throttle operator and to output a data signal that is indicative of the detected position of the throttle operator, a controller communicating with the operator position sensor to receive the data signal and being configured to output a control signal in response to the data signal, and an actuator communicating with the controller and being coupled to the throttle device, the actuator being adapted to adjust the throttle device in response to the control signal from the controller, wherein the throttle device control system is configured such that the actuator only adjusts the position of the throttle device after the watercraft reaches a planing state.

18. A small watercraft comprising a hull, an internal combustion engine disposed within the hull, the engine including an air induction system that supplies air to the engine and includes a throttle device to regulate the amount of air supplied to the engine, a steering mechanism including a handlebar assembly coupled to the hull, and a throttle device control system that includes a throttle operator located on the handlebar assembly and arranged to be controlled by a rider of the watercraft, means for detecting a position of the throttle operator, and means for moving said throttle device in response to the detected position of the throttle operator; wherein the throttle device control system is configured such that an actuator only adjusts the position of the throttle device until the watercraft reaches a planing state.

19. The small watercraft of claim 18, wherein the throttle operator is located near a hand grip on the handlebar assembly.

20. The small watercraft of claim 18, wherein the throttle device comprises a plurality of throttle valves.

21. A small watercraft comprising a hull, an internal combustion engine disposed within the hull, the engine including an air induction system that supplies air to the engine and includes a throttle device to regulate the amount of air supplied to the engine, a steering mechanism including a handlebar assembly coupled to the hull, and a throttle device control system that includes a throttle operator located on the handlebar assembly and arranged to be controlled by a rider of the watercraft, means for detecting a position of the throttle operator, and means for moving said throttle device in response to the detected position of the throttle operator, wherein the means for detecting the position of the throttle operator is located within a substantially waterproof compartment of a case that is mounted near a grip on the handlebar assembly, and the throttle operator is coupled to the case.

22. The small watercraft of claim 21, wherein the throttle operator includes a rotational shaft that is supported for rotation within the case.

23. The small watercraft of claim 21, wherein the waterproof case includes another compartment in which a biasing member that biases the throttle operator to an idling position is disposed.

24. A small watercraft comprising a hull, an internal combustion engine disposed within the hull, the engine including an air induction system that supplies air to the engine and includes a throttle device to regulate the amount of air supplied to the engine, a steering mechanism including a handlebar assembly coupled to the hull, and a throttle device control system that includes a throttle operator located on the handlebar assembly and arranged to be controlled by a rider of the watercraft, means for detecting a position of the throttle operator, and means for moving said throttle device in response to the detected position of the throttle operator, wherein the throttle device control system is configured such that an actuator only adjusts the position of the throttle device after the watercraft reaches a planing state.

25. A small watercraft comprising a hull, an internal combustion engine disposed within the hull, an air control device to regulate the amount of air supplied to the engine, a steering mechanism including a handlebar assembly coupled to the hull, and a control system that includes an operator located on the handlebar assembly and arranged to be controlled by a rider of the watercraft, an operator position sensor that is configured to detect the position of the operator and to output a data signal that is indicative of the detected position of the operator, an electronic controller communicating with the operator position sensor to receive the data signal and being configured to output a control signal in response to the data signal, and an actuator of the air control device that is in communication with the controller, the actuator being adapted to adjust the air control device in response to the control signal from the controller.

26. The small watercraft of claim 25, wherein the operator position sensor is located on the handlebar assembly.

27. The small watercraft of claim 25, wherein the operator position sensor is located within a substantially waterproof case that is mounted on an exterior of the watercraft.

28. The small watercraft of claim 27, wherein the case is located near a grip of the handlebar assembly, and the operator is coupled to the case.

29. The small watercraft of claim 25, wherein the operator includes a throttle lever.

30. The small watercraft of claim 25, wherein the control system is configured such that the actuator only adjusts the position of the air control device until the watercraft reaches a planing state.

31. The small watercraft of claim 25, wherein the control system is configured such that the actuator only adjusts the position of the air control device after the watercraft reaches a planing state.

32. The small watercraft of claim 25, wherein the air control device comprises a throttle valve.

33. The small watercraft of claim 25, wherein the operator is located near a hand grip on the handlebar assembly.

34. A watercraft comprising a hull including a lower portion and an upper portion, an engine supported by the hull, an induction system connected to the engine and configured to guide air into the engine, a throttle valve disposed in the induction system and configured to control an amount of air flow through the induction system, a rider's area supported by the upper portion of the hull, a handle bar pivotally supported in the rider's area and configured to steer the watercraft, a throttle input device disposed on the handlebar comprising an input lever and a lever position sensor configured to detect a position of the input lever and produce a signal indicative of a position of the input member, a throttle controller connected to the throttle valve and configured to move the throttle valve in accordance with the signal, a first spring biasing the input lever to an idle position and a second spring biasing the throttle valve to an idle position, the first spring being weaker than the second spring.

35. A watercraft comprising a hull including a lower portion and an upper portion, an engine supported by the hull, an induction system connected to the engine and configured to guide air into the engine, a throttle valve disposed in the induction system and configured to control an amount of air flow through the induction system, a rider's area supported by the upper portion of the hull, a handle bar pivotally supported in the rider's area and configured to steer the watercraft, a throttle input device disposed on the handlebar comprising an input lever and a lever position sensor configured to detect a position of the input lever and produce a signal indicative of a position of the input member, an electronic throttle controller connected to the throttle valve and configured to move the throttle valve in accordance with the signal, a first spring biasing the input lever to an idle position and a second spring biasing the throttle valve to an idle position, the first spring being configured such that an effort required to move the input lever to a first position is easier than an effort that would be required to move the throttle valve to a position, corresponding to the first position of the input lever, with only a mechanical connection between the inputlever and the throttle valve.

* * * * *

UNITED STATES PATENT AND TRADEMARK OFFICE

CERTIFICATE OF CORRECTION

PATENT NO. : 6,551,153 B1
DATED : April 22, 2003
INVENTOR(S) : Hattori, Toshiyuki It is certified that error appears in the above-identified patent and that said Letters Patent is hereby corrected as shown below:

Column 16,
Line 2, please delete "inputlever" and insert -- input lever --.

Signed and Sealed this

Twenty-ninth Day of June, 2004

JON W. DUDAS
*Acting Director of the United States Patent and Trademark Office*